(12) United States Patent
Pappu et al.

(10) Patent No.: US 9,061,355 B2
(45) Date of Patent: Jun. 23, 2015

(54) TOOL ADAPTOR HAVING AN INTEGRATED DAMPING DEVICE

(75) Inventors: Krishna Pappu, Nuremberg (DE); Ruy Frota De Souza, Latrobe, PA (US); Horst Manfred Jaeger, Nuremberg (DE)

(73) Assignee: KENNAMETAL INC., Latrobe, PA (US)

(*) Notice: Subject to any disclaimer, the term of this patent is extended or adjusted under 35 U.S.C. 154(b) by 266 days.

(21) Appl. No.: 13/538,337

(22) Filed: Jun. 29, 2012

(65) Prior Publication Data

US 2014/0001715 A1 Jan. 2, 2014

(51) Int. Cl.
*B23B 31/08* (2006.01)
*B23B 31/02* (2006.01)
*B23B 31/107* (2006.01)

(52) U.S. Cl.
CPC ........... *B23B 31/02* (2013.01); *Y10T 279/3406* (2015.01); *Y10T 279/16* (2015.01); *Y10T 408/665* (2015.01); *Y10T 408/95* (2015.01); *Y10T 409/30952* (2015.01); *Y10T 408/76* (2015.01); *B23B 31/1075* (2013.01); *B23B 2226/33* (2013.01); *B23B 2250/12* (2013.01); *B23B 2250/16* (2013.01)

(58) Field of Classification Search
CPC .. B23B 31/08; B23B 31/107; B23B 31/1075; B23B 2226/33; Y10T 409/304312; Y10T 409/30952; Y10T 409/309408; Y10T 408/94; Y10T 408/95; Y10T 408/9098; Y10T 408/76; Y10T 408/73; Y10T 408/665; Y10T 279/16; Y10T 279/17017; Y10T 279/17025; Y10T 279/17034

USPC .......... 409/141, 234, 232; 408/143, 231, 233, 408/238, 239 R, 239 A, 127, 141; 279/8, 279/16–18

See application file for complete search history.

(56) References Cited

U.S. PATENT DOCUMENTS

| | | | | |
|---|---|---|---|---|
| 357,025 A | * | 2/1887 | Pearn | 408/140 |
| 671,447 A | | 4/1901 | Morgan et al. | |
| 956,298 A | | 4/1910 | Cudahy | |
| 1,290,427 A | | 1/1919 | Velk | |
| 1,763,717 A | * | 6/1930 | Morgan | 470/209 |
| 2,244,143 A | | 6/1941 | Dowler | |
| 2,392,039 A | * | 1/1946 | Gideon | 279/16 |

(Continued)

FOREIGN PATENT DOCUMENTS

| | | | |
|---|---|---|---|
| DE | 918980 C | * | 8/1954 |
| DE | 85 05 616.2 U1 | | 8/1986 |

(Continued)

OTHER PUBLICATIONS

Machine translation of SU 1212713 from the EPO website, printed Jun. 2014.*

(Continued)

*Primary Examiner* — Daniel Howell
(74) *Attorney, Agent, or Firm* — Larry R. Meenan

(57) ABSTRACT

A tool adapter includes an adaptor body having a connection portion structured to be attached to a machine tool and a holder portion disposed opposite the connection portion and a tool receiver structured to receive and couple a portion of a rotary cutting tool therein. The tool receiver is mounted in the holder portion so as to be rotatable to a limited extent. The tool receiver is mounted in the holder so as to be elastically resilient in both the axial and circumferential directions.

12 Claims, 5 Drawing Sheets

(56) References Cited

U.S. PATENT DOCUMENTS

| | | | |
|---|---|---|---|
| 2,547,518 A | | 4/1951 | Benjamin et al. |
| 2,570,752 A | * | 10/1951 | Benjamin et al. ............... 279/16 |
| 2,626,029 A | * | 1/1953 | Gutterman ..................... 464/40 |
| 2,791,433 A | | 5/1957 | Dodd |
| 3,343,190 A | * | 9/1967 | Lutz ............................... 279/16 |
| 3,663,116 A | | 5/1972 | Muller et al. |
| 3,688,324 A | * | 9/1972 | Gosman ........................ 470/198 |
| 3,778,071 A | | 12/1973 | Buck |
| 3,837,758 A | | 9/1974 | Streicher |
| 4,080,090 A | * | 3/1978 | Kern ............................... 408/59 |
| 4,447,181 A | | 5/1984 | Asano |
| 4,491,044 A | | 1/1985 | Haas et al. |
| 4,605,349 A | | 8/1986 | Bone |
| 4,714,389 A | | 12/1987 | Johne |
| 5,033,340 A | | 7/1991 | Siefring |
| 5,538,371 A | | 7/1996 | Kubo |
| 5,716,173 A | | 2/1998 | Matsumoto |
| 5,865,575 A | * | 2/1999 | Johnson ........................ 408/139 |
| 5,882,015 A | * | 3/1999 | McPherson .................... 279/16 |
| 5,915,892 A | * | 6/1999 | Glimpel et al. ............... 408/141 |
| 5,975,816 A | | 11/1999 | Cook |
| 6,047,621 A | | 4/2000 | Dries et al. |
| 6,071,219 A | | 6/2000 | Cook |
| 6,082,236 A | | 7/2000 | Andreassen |
| 6,537,000 B1 | * | 3/2003 | Weck ............................ 409/141 |
| 6,569,022 B2 | * | 5/2003 | Johnson et al. ................ 470/96 |
| 6,599,068 B1 | | 7/2003 | Miyazawa |
| 8,043,036 B2 | | 10/2011 | Cook |
| 8,118,312 B2 | | 2/2012 | Walters |
| 2001/0056013 A1 | | 12/2001 | Cook |
| 2003/0147712 A1 | | 8/2003 | Kai et al. |
| 2003/0228199 A1 | | 12/2003 | Matsumoto et al. |
| 2007/0231092 A1 | | 10/2007 | Flam |
| 2008/0260483 A1 | | 10/2008 | Cook |
| 2009/0209356 A1 | | 8/2009 | Komine et al. |
| 2010/0310333 A1 | | 12/2010 | Weber |
| 2011/0255932 A1 | | 10/2011 | Cook et al. |
| 2011/0266756 A1 | | 11/2011 | Haimer |
| 2012/0207560 A1 | | 8/2012 | Sakamaki et al. |
| 2012/0301240 A1 | | 11/2012 | Jager et al. |

FOREIGN PATENT DOCUMENTS

| | | | |
|---|---|---|---|
| DE | 3835879 C1 | | 1/1990 |
| DE | 689 02 953 T2 | | 3/1993 |
| DE | 42 39 769 C2 | | 6/1994 |
| DE | 197 17 835 A1 | | 10/1998 |
| DE | 199 82 996 B4 | | 8/2002 |
| DE | 602 05 935 T2 | | 6/2006 |
| DE | 102004062443 A1 | | 7/2006 |
| EP | 51097 A1 | * | 5/1982 |
| JP | 58202720 A | * | 11/1983 |
| SU | 643254 A | * | 1/1979 |
| SU | 664756 A | * | 5/1979 |
| SU | 1061943 A | * | 12/1983 |
| SU | 1094680 A | * | 5/1984 |
| SU | 1212713 A | * | 2/1986 |
| SU | 1281347 A | * | 1/1987 |
| SU | 1342615 A | * | 10/1987 |
| SU | 1750859 A1 | * | 7/1992 |
| SU | 1780942 A1 | * | 12/1992 |
| WO | 2011136463 A1 | | 11/2011 |

OTHER PUBLICATIONS

German Patent Office, "Office Action for corresponding application DE 10 2013 106 589.9 (no English language translation available)", Mar. 6, 2015, 6 pp.

* cited by examiner

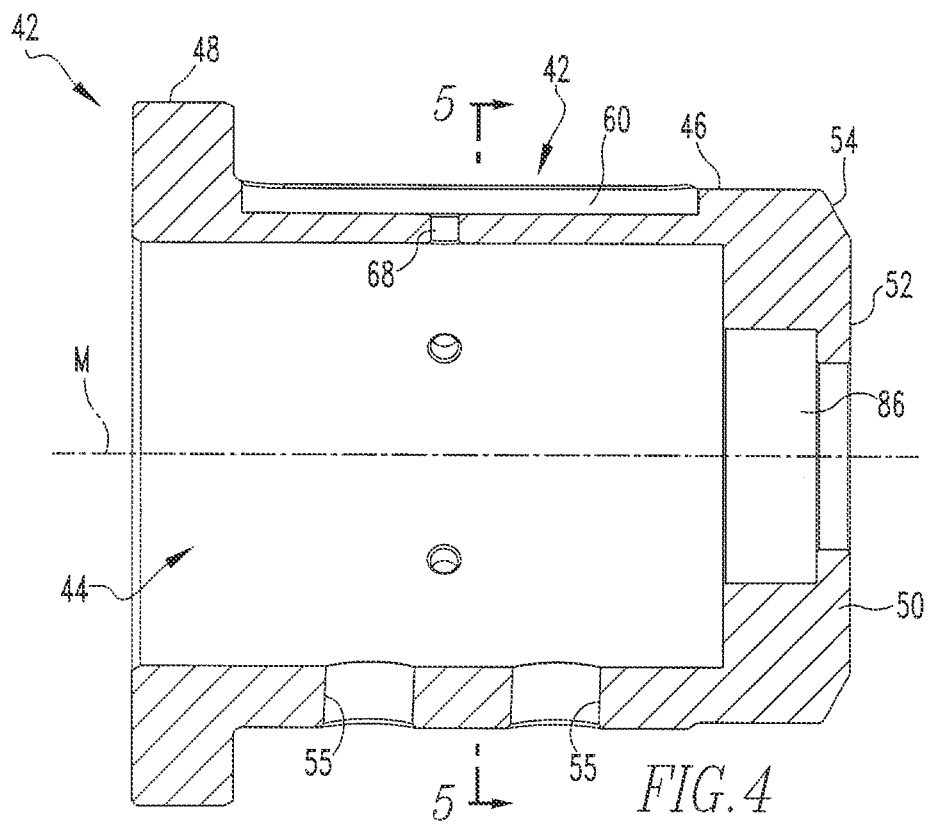
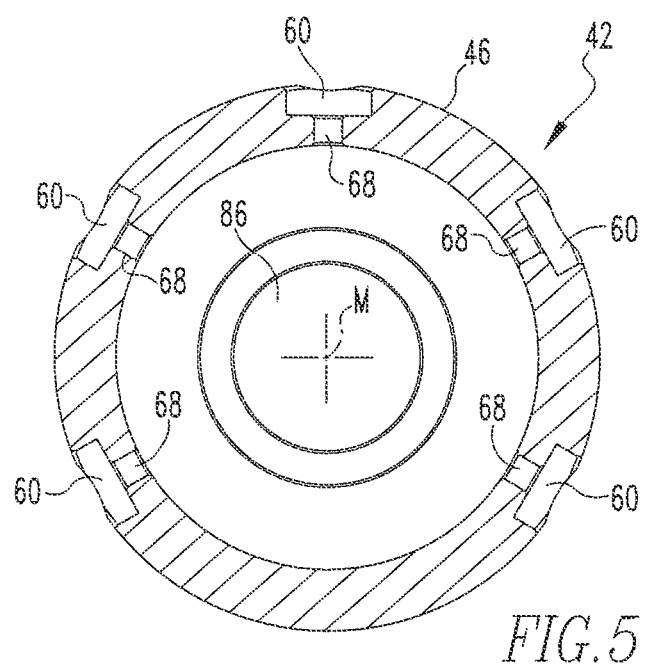

TOOL ADAPTOR HAVING AN INTEGRATED DAMPING DEVICE

BACKGROUND

1. Field of the Invention

The invention relates generally to tool adapters having a holder, which can be attached to a machine tool, and having a tool receiver, in which a tool can be received.

2. Background Information

An example tool adapter for which the present invention improves upon is shown in U.S. Pat. No. 6,082,236. Here, the tool receiver is realized as a collar, which is rotatably mounted inside the holder by means of two bearing rings. Vulcanized-in between the outer surface of the tool receiver and the inner surface of the holder there is a rubber bushing, which limits the rotation of the tool receiver relative to the holder. A torque can be transmitted from the holder to the tool receiver via the rubber bushing, while, at the same time, vibrations that occur in a radial direction can be damped. In this way, it is also possible to reduce noise produced during the machining of a workpiece by means of a toot clamped in the tool receiver.

While useful for damping vibrations to a certain extent, there is still room for improvement in terms of vibration damping capabilities over conventional tool adaptors.

SUMMARY OF THE INVENTION

The present invention provides a tool adapter that provides both damping and high torque capabilities during machining processes. The tool adapter comprises an adaptor body and a tool receiver. The adaptor body includes a connection portion structured to be attached to a machine tool and a holder portion disposed opposite the connection portion. The tool receiver is structured to receive and couple a portion of a rotary cutting tool therein. The tool receiver is mounted in the holder portion so as to be rotatable about a central axis of the tool adaptor to a limited extent. The tool receiver is mounted in the holder portion so as to be elastically resilient in both the axial and circumferential directions.

The holder portion may include a number of axial grooves and the tool receiver may include a corresponding number of torque transmission elements coupled thereto and extending radially therefrom, each torque transmission element being disposed within a corresponding groove of the number of axial grooves. Each torque transmission element may comprise a rigid portion coupled to the tool receiver and an elastomeric portion disposed between the rigid portion and the tool receiver.

The tool receiver may include an outer surface having a number of receivers formed therein and the rigid portion of each torque transmission element may be disposed in a corresponding receiver of the number of receivers. Each receiver may include a threaded aperture and each rigid portion may be coupled to a corresponding receiver via a setting screw threadingly engaged with the aperture.

The holder portion may comprise a cavity beginning at a mouth portion, extending through a central portion, and ending with an end portion, the end portion having an end face disposed generally perpendicular to the central axis. The tool receiver may comprise a flange portion disposed in the mouth portion and a damping member provided in the mouth portion axially between the flange portion and an edge of the central portion of the cavity.

The tool receiver may comprise an end portion oriented generally perpendicular to the central axis and disposed in the end portion and a damping member provided in the end portion axially between the end portion and the end face of the cavity. The damping member may be generally ring-like in shape and may have an increased thickness along is outer circumference.

The tool receiver may be coupled to the adaptor body via an axial clamp screw which passes through an aperture formed in the tool receiver and threadingly engages a threaded aperture formed in the adaptor body.

The axial clamp screw may comprise an elastomeric member provided between a head portion of the axial clamp screw and the tool receiver.

The adaptor body may comprise a coolant passage disposed between the connection portion and the holder portion, the axial clamp screw may comprise a central passage, and the coolant passage and the central passage may be structured to provide a supply of coolant from the machine tool to the rotary cutting tool.

The tool receiver may further comprise a sealing member having one or more openings disposed between the rotary cutting tool and an end portion of the tool receiver, the sealing member being structured to prevent the escape of coolant from between the rotary cutting tool and the tool receiver.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A full understanding of the invention can be gained from the following description of the preferred embodiments when read in conjunction with the accompanying drawings in which:

FIG. 4 shows a sectional view of the tool receiver of the tool adapter from FIG. 1;

FIG. 5 shows a sectional view of the tool receiver of FIG. 4 taken along line 5-5 of FIG. 4;

DESCRIPTION OF THE PREFERRED EMBODIMENTS

Figure 1:
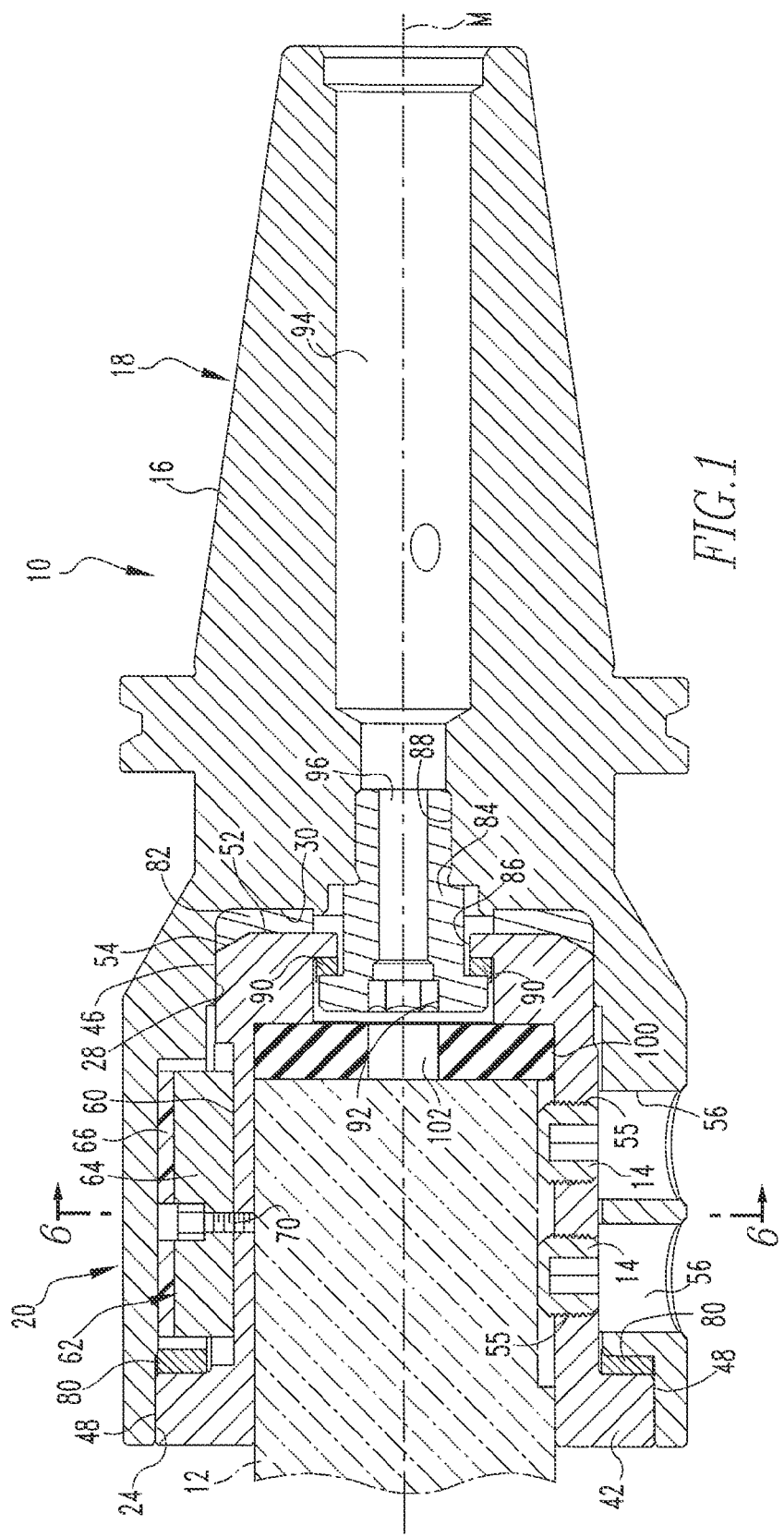
FIG. 1 shows a sectional view of an embodiment of a tool adapter according to the present invention with a portion of a rotary cutting tool shown installed therein.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity, i.e., one or any quantity greater than one.

FIG. 1 shows a tool adapter 10 which serves to receive and couple a rotary cutting tool 12 (a portion of which is shown in phantom line in FIG. 1) such as, for example, without limitation, a drill, to a machine tool (not shown) in accordance with an example embodiment of the present invention in a manner such that tool adaptor 10, and thus rotary cutting tool 12, can be rotated about a central axis M by the machine tool. Rotary cutting tool 12 can be clamped in the tool adapter 10 via a clamping mechanism 14. In the example illustrated embodiment, rotary cutting tool 12 is shown as having a Weldon shank which is engaged by the clamping mechanism 14 (e.g., without limitation, two setscrews), it is to be appreciated, however, that other cooperating arrangements for clamping a rotary cutting tool may be employed without varying from the scope of the present invention. Tool adapter 10 includes an adaptor body 16 having a connection portion 18 which is adapted to be clamped into a machine tool (not shown) such that rotary cutting tool 12 can be driven, for example, made to rotate.

Figure 2:
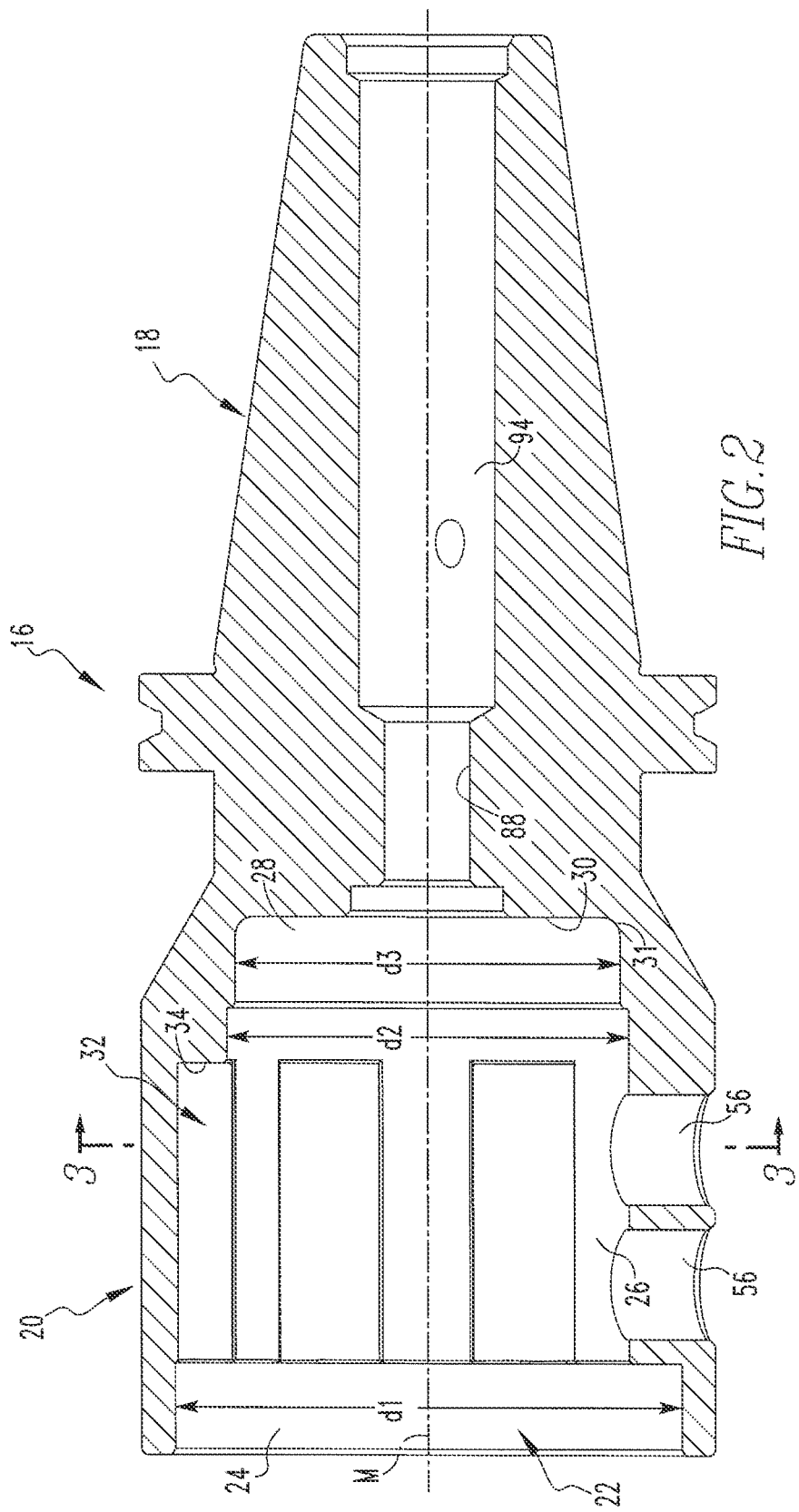
FIG. 2 shows a sectional view of the adaptor body of the tool adapter from FIG. 1.

Referring to FIG. 2, adaptor body 16 further includes a holder portion 20 disposed generally opposite connection portion 18. Adaptor body 16, as well as connection portion 18 and holder portion 20 is made of metal. Continuing to refer to FIG. 2, holder portion 20 has a generally collar-type form and includes a cavity 22 formed therein. Cavity 22 is disposed about the central axis M and, moving inward, is generally defined beginning at a generally cylindrical mouth portion 24 having a first diameter d1, a generally cylindrical central portion 26 having a second diameter d2, and a generally cylindrical end portion 28 having a third diameter d3. In the example embodiment illustrated in FIG. 2, first diameter d1 is greater than second diameter d2, which is greater than third diameter d3. Cavity 22 is further defined by an end face 30 of holder portion 20, which is aligned perpendicularly in relation to center axis M. In the example embodiment illustrated, end face 30 transitions into the wall of end portion 28 via a radiused portion 31.

Figure 3:
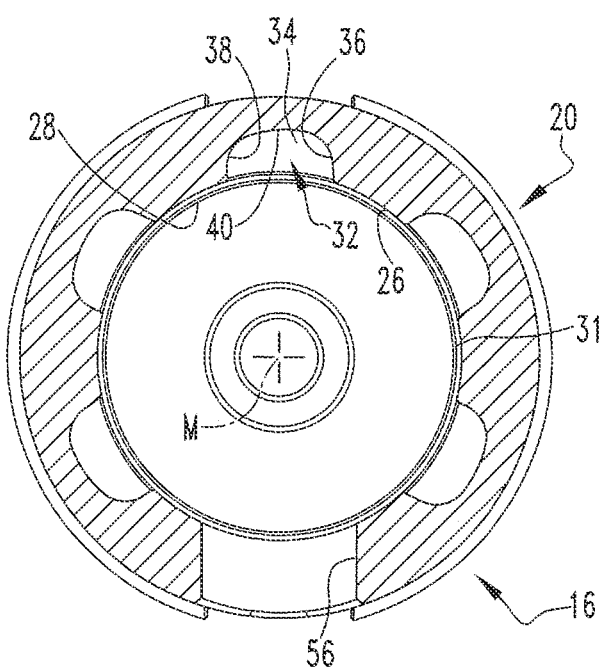
FIG. 3 shows a sectional view of the adaptor body of FIG. 2 taken along line 3-3 of FIG. 2.

Referring to FIGS. 2 and 3, central portion 26 of cavity 22 includes a plurality of outwardly extending axial grooves 32 (five are shown in the illustrated example embodiment) distributed around the circumference thereof. As shown in FIG. 2, each of axial grooves 32 extend longitudinally from mouth portion 24 to a short end face 34 disposed generally perpendicular to central axis M such that each of the axial grooves 32 are disposed generally parallel to central axis M. As shown in FIG. 3, each axial groove 32 is generally defined circumferentially by two lateral surfaces 36, 38 and a curved outer surface 40. The two lateral surfaces are disposed opposite each other in the circumferential direction and aligned perpendicular to short end face 34. It is to be appreciated that the particular cross-sectional shape of each axial groove 32 described herein is given for example purposes only and that one or more of the dimensions of shape of such grooves may be varied without varying from the scope of the present invention.

Referring again to FIG. 1, tool adaptor 10 further includes a tool receiver 42 disposed within holder portion 20 of adaptor body 16. Tool receiver 42 is realized in the form of a collar disposed about a cavity 44 (FIG. 4) in which the rotary cutting tool 12 can be disposed and selectively coupled, such a via clamping mechanism 14. Referring to FIG. 4, similar to adaptor body 16, tool receiver 42 is composed of metal, and has a generally cylindrical outer surface 46 extending from a flange portion 48, disposed adjacent the opening (not numbered) of cavity 44, to an opposite end portion 50 disposed generally perpendicular to central axis M. Outer surface 46 transitions into an outer face 52 (also disposed generally perpendicular to central axis M) of end portion 50 via a beveled portion 54. As shown in the sectional view of FIG. 1, the flange portion 48 of the tool receiver 42 is dimensioned to match the dimensions of the mouth portion 24 of the cavity 22 and the outer surface 46 of the tool receiver 42 near the beveled portion 54 is dimensioned to match the dimensions of the end portion 28 of the cavity 22 such that the tool receiver 42 is received without play inside the holder portion 20 of the adaptor body 16 in a manner such that the tool receiver is aligned with the central axis M. As used herein, the phrase "without play" means that the mouth portion 24 and end portion 28 of cavity 22 define the alignment of the tool receiver 42 in the area of the flange portion 48 as well as the outer surface 46 near the beveled portion 54, in a precise manner, while, at the same time, the tool receiver 42 can be rotated inside the holder portion 20. In the example embodiment illustrated, such arrangement provides for two degrees of freedom in potential movement of the tool receiver 42 within the holder portion 20, axial (movement along central axis M) and tangential (rotation about central axis M).

In the example embodiment illustrated, tool receiver 42 includes a pair of threaded apertures 55 which, as shown in FIG. 1, are threadingly engaged by the clamping mechanism 14, previously discussed. As a result of such arrangement, the rotary cutting tool 12 is rigidly coupled to the tool receiver 42 only, and thus is not rigidly coupled to the adaptor body 16. As shown in FIGS. 1 and 2, a pair of access ports 56, each sized larger than clamping mechanism 14 are provided in the adaptor body 16 in order to provide access to clamping mechanism 14 and avoid any rigid engagement between the clamping mechanism 14 and the adaptor body 16. The full benefits of such arrangement will become readily apparent with the further discussion below.

Figure 6:
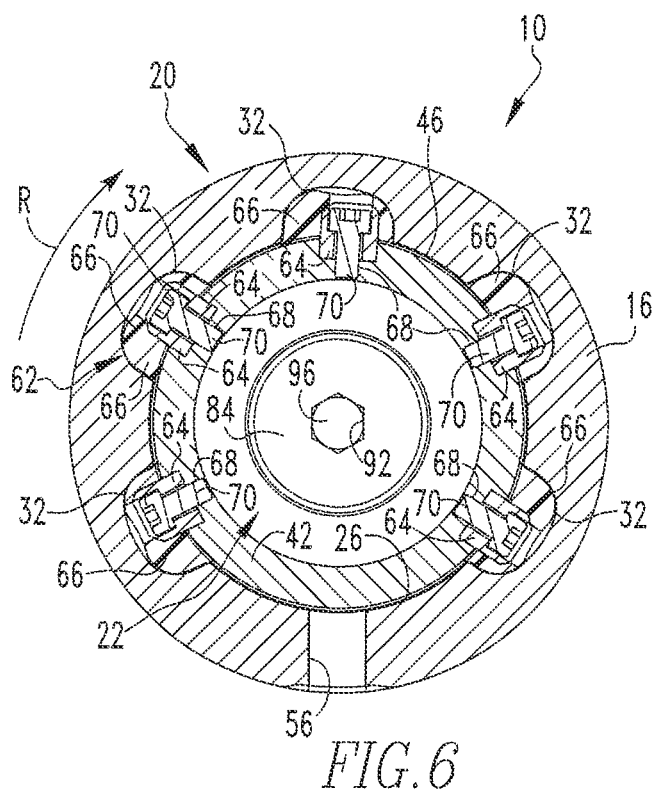
FIG. 6 shows a sectional view of the tool adaptor of FIG. 1 taken along the line 6-6 of FIG. 1 with the rotary cutting tool removed.
Figure 7:
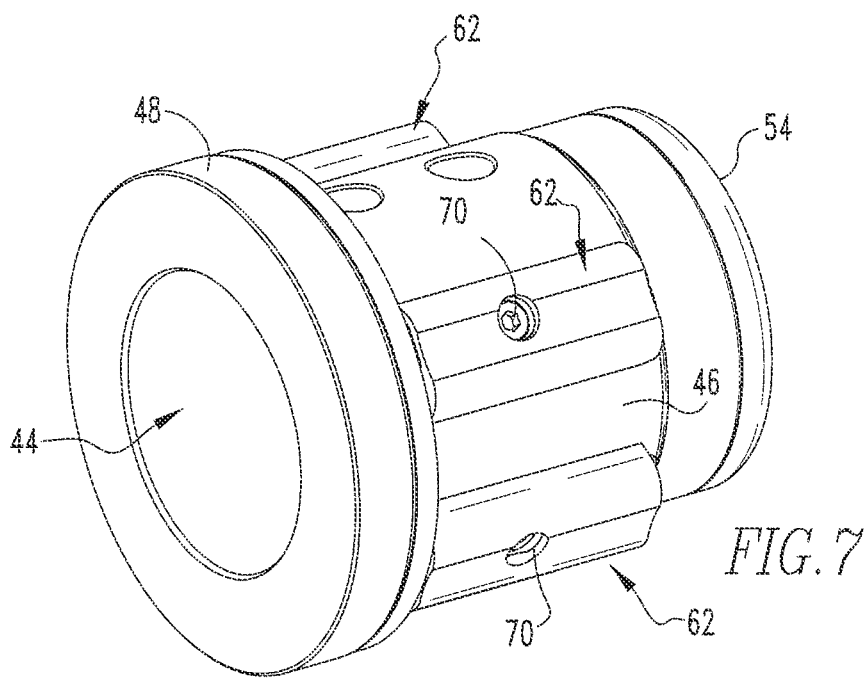
FIG. 7 shows an isometric view of the tool receiver and torque transmission elements of the tool adaptor of FIG. 1.

Referring to FIGS. 4 and 5, the outer surface 46 of the tool receiver 42 is provided with a number of receivers 60 (five are shown in the illustrated example embodiment), which correspond to the axial grooves in the cavity 22 of the holder portion 20, and in each of which a partially elastic torque transmission element 62 can be disposed, which in the illustrated example embodiment is realized in the form of a vulcanized feather key (see, FIGS. 1, 6 and 7). It is to be appreciated that the quantity of transmission elements 62 and corresponding receivers 60 may be varied depending on one or more of the particular size or machining application in which the tool adaptor 10 is employed. It is also to be appreciated that the greater the quantity of partially elastic torque transmission elements employed, the better the damping provided. However, the size of the elements and the added cost associated with increasing the quantity of components are generally limiting factors.

As shown in the sectional views of FIGS. 1 and 6, each vulcanized feather key includes a base portion 64 formed from metal and an upper portion 66 formed from an elastomer, plastic, or other suitable material which is softer that the adjacent metal portions and thus prevents metal to metal contact and provides damping properties. Examples of suitable material for upper portion 66 include, without limitation, Neoprene, Nitrile-butadiene and Isoprene. Although transmission elements 62 in the form of vulcanized feather keys are shown in the illustrated example embodiment, it is to be appreciated, however, that other suitable transmission means, e.g., without limitation, a separate feather key with a separate elastomeric element or elements (in place of single upper portion 66) could be employed without varying from the scope of the present invention. It is also to be appreciated that although shown as generally occupying all of the free space between base portion 64 and the walls of axial groove 32, upper portion (or portions) 66 may occupy less than the remainder of the space in axial grooves 32. In such embodiments, the remaining "empty" space left in the axial grooves (whether provided circumferentially or axially) is provided to allow for the softer material from which the upper portion or portions 66 are formed to deform or move slightly within each axial groove 32 as desired for the particular application.

Each torque transmission element 62 has an elongate form, whose longitudinal axis extends parallel to the central axis M, with the base portion 64 portion engaging substantially without play in a corresponding receiver 60 in the tool receiver 42. As shown in FIG. 6, the elastomeric upper portion 66 is offset in the direction of rotation, shown by the arrow R, which provides for torsional damping during machining operations. For the purpose of fastening the torque transmission elements 62 to the tool receiver 42, a threaded aperture 68 is provided in each receiver 60 into which a setting screw 70, realized in the form of an alien screw in the illustrated embodiment, may be screwed to selectively couple each of the torque transmission elements 62 into the corresponding receivers 60. As shown in FIGS. 1 and 6, when the tool receiver 42 is installed in the holder portion 20 of the adaptor body 16, each of the torque transmission elements 62 fit snugly in corresponding axial grooves 32. As used herein, the term "snugly" shall be used to indicate the presence of at least a slight interference fit.

In addition to the torsional damping of the tool receiver 42 provided by the elastomeric upper portions 66 of the torque transmission elements 62, axial damping is also provided to the tool receiver 42 through the inclusion of a plurality of elastomeric elements provided axially between the tool receiver 42 and the adaptor body 16. Referring to FIG. 1, a ring-like first damping member 80 is provided in mouth portion 24 of cavity 22 axially between the flange portion 48 of the tool receiver 42 and the edge (not numbered) of the central portion 26 of the cavity 22. Another ring-like second damping member 82 is provided in the end portion 28 axially between the outer face 52 and the beveled portion 54 of the tool receiver 42 and the end face 30 of cavity 22. The second damping member 82 is thickened along its circumference, such that, in combination with the beveled portion 54 of the tool receiver 42, a wedge effect is achieved. Each of first and second damping members 80,82 may be formed from an elastomer, plastic, or other suitable material which is softer than the adjacent metal portions and thus prevent metal to metal contact and provide damping properties. Examples of suitable materials from which the first and second damping members 80, 82 may be formed include, without limitation, Neoprene, Nitrile-butadiene and Isoprene. It is to be appreciated that although generally depicted as flat, washer-like members in the illustrated embodiment, each of damping members 80,82 may be formed of members of other shapes (e.g., without limitation, o-ring shaped) and may be continuous or formed generally from a plurality of members, either abutting or spaced circumferentially, without varying from the scope of the present invention.

As shown in FIG. 1, in order to couple the tool receiver 42 to the adaptor body 16, an axial clamp screw 84 is provided which extends through a stepped aperture 86 which extends through end portion 50 of tool receiver 42 and threadingly engages a threaded aperture 88 formed in the adaptor body 16 concentric with the central axis M. In order to maintain the axial damping of the tool receiver as previously described, an elastomeric washer or o-ring 90 is provided between the head portion (not numbered) of the clamp screw 84 and the step of the stepped aperture 86. It is to be appreciated that the threaded engagement between the clamp screw 84 and the adaptor body 16 allows for the axial preload provided to the first and second elastomeric members 80 and 82 to be adjusted by simply tightening or loosening the clamp screw 84. In the example embodiment illustrated, such adjust can be accomplished through the use of an alien wrench (not shown) inserted onto cavity 22 of adaptor body 16 (when the rotary cutting tool 12 is not installed) such that the hexagonally shaped end of the wrench engages a hexagonally shaped cavity 92 provide in the head of the clamp screw 84.

The example tool adaptor 10 illustrated is adapted to be able to provide an internal flow of coolant to the rotary cutting tool 12 secured therein. In order to provide such feature, a coolant passage 94 is provided in the adaptor body 16 between the connection portion 18 and the holder portion 20. Also, a central passage 96 is provided in the clamp screw 84 such that coolant provided from the machine tool (not shown) to the connection portion 18 is provided to the rotary cutting tool 12 secured in the tool receiver 42 via the coolant passage 94 and the central passage 96. In order to prevent coolant leakage from between the cutting tool 12 and the tool receiver 42, a sealing member 100 (FIG. 1, e.g., without limitation, a rubber bushing) having one or more suitably positioned openings 102 (depending on the arrangement of the coolant passage(s) in the tool body 12) is disposed between the rearmost portion (not numbered) of the tool body 12 and the end portion 50 of the tool receiver 42. It is to be appreciated the coolant passage 94, central passage 96, and sealing member 100 are optional elements present in some example embodiments and thus such features may be omitted from other example embodiments of the present invention.

When the rotary cutting tool 12 is to be driven, a torque is transmitted from the adaptor body 16 to the tool receiver 42 and from there to the tool 12. Since the tool receiver 42 is elastically mounted inside the adaptor body 16, vibrations that occur during machining performed by means of the tool 12 undergo extensive damping. On the one hand, this is effected in the axial direction, owing to the elastic elements 80, 82 and 90. On the other hand, vibrations are damped in the circumferential direction, since the tool receiver 42 is coupled to the adaptor body 16 in an elastically resilient manner via the torque transmission elements 62, the base portions 64 of which are guided in the receivers 60 of the tool receiver 42 and the upper damping portions 66 thereof are engaged in the axial grooves 32 formed in the holder portion 20 of the adaptor body 16. Such arrangement provides for a high load capacity and, at the same time, a long service life because the damping elements are supported over a large area and are shielded from the machining operations by the adaptor body 16 itself.

A particular advantage of the tool adapter 10 described herein consists in that the bias of the elastic elements 80, 82 and 90 can be set by simply turning a alien wrench. It is thereby possible to set the frequencies at which a particularly high damping is effected. A maximum of vibration damping can thus be achieved for any desired machining, such that there is a maximum reduction of the noise produced during machining.

In view of the foregoing, it is to be appreciated that embodiments of the present invention provide tool adaptors that are particularly useful in applications where large and long tools are used to machine tough and hard materials. Demand for higher feed, speed and material removal rate (MRR) generally results in high cutting forces, vibrations due to chattering, and therefore bad surface quality and reduced tool life.

Embodiments of the present invention compensate for such vibrations and thus the noises resulting from such vibrations, which are the main problems in machining processes. By eliminating such "non-required" properties, tool and insert life, surface quality and spindle bearing life may be improved. Embodiments of adaptors in accordance with the invention described herein are applicable to drilling, milling (end mills) and tapping operations. In drilling operations, axial vibrations may commonly result from torsional vibrations due to the helical shape of the flutes. Axial vibrations can adversely affect chip thickness and thus undesirably cause variations in torque. During machining processes, tool movements (both rotational and axial) are directly transferred in embodiments of the present invention through the tool receiver 42 to the elastomeric elements which are disposed circumferentially and axially between the tool receiver 42 and the adaptor body 16. The elastomeric elements provide required damping by absorbing and dissipating energy. Such damping occurs both radially and axially throughout the machining process at a constant rate directly proportional to the cutting forces. Calming down any tool directly results in chatter free machining and therefore good surface quality and tool life. Also, due to the reduction or elimination of vibrations, noises produced during machining are reduced which provides for a more operator friendly work environment.

While a specific embodiment of the invention has been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A tool adapter comprising:
an adaptor body having a connection portion structured to be attached to a machine tool and a holder portion disposed opposite the connection portion; and
a tool receiver structured to receive and couple a portion of a rotary cutting tool therein, the tool receiver being mounted in the holder portion so as to be rotatable about a central axis of the tool adaptor to a limited extent,
wherein the tool receiver is mounted in the holder portion so as to be elastically resilient in both the axial and circumferential directions,
wherein the holder portion includes a number of axial grooves,
wherein the tool receiver includes a corresponding number of torque transmission elements coupled thereto and extending radially therefrom, each disposed within a corresponding groove of the number of axial grooves, and
wherein each torque transmission element comprises a rigid portion coupled to the tool receiver and an elastomeric portion disposed between the rigid portion and the tool receiver.

2. The tool adaptor of claim 1 wherein the tool receiver includes an outer surface having a number of receivers formed therein, and wherein the rigid portion of each torque transmission element is disposed in a corresponding receiver of the number of receivers.

3. The tool adaptor of claim 2 wherein each receiver includes a threaded aperture and wherein each rigid portion is coupled to a corresponding receiver via a setting screw threadingly engaged with the aperture.

4. The tool adaptor of claim 1 wherein the holder portion comprises a cavity beginning at a mouth portion, extending through a central portion, and ending with an end portion; and
wherein the tool receiver comprises:
a flange portion disposed in the mouth portion; and
a damping member provided in the mouth portion axially between the flange portion and an edge of the central portion of the cavity.

5. A tool adapter comprising:
an adaptor body having a connection portion structured to be attached to a machine tool and a holder portion disposed opposite the connection portion; and
a tool receiver structured to receive and couple a portion of a rotary cutting tool therein, the tool receiver being mounted in the holder portion so as to be rotatable about a central axis of the tool adaptor to a limited extent,
wherein the tool receiver is mounted in the holder portion so as to be elastically resilient in both the axial and circumferential directions,
wherein the holder portion comprises a cavity beginning at a mouth portion extending through a central portion and ending with an end portion, the end portion having an end face disposed generally perpendicular to the central axis,
wherein the tool receiver comprises:
an end portion oriented generally perpendicular to the central axis and disposed in the end portion, and
a damping member provided in the end portion axially between the end portion and the end face of the cavity, and
wherein the damping member is generally ring-like in shape and has an increased thickness along its outer circumference.

6. A tool adapter comprising:
an adaptor body having a connection portion structured to be attached to a machine tool and a holder portion disposed opposite the connection portion; and
a tool receiver structured to receive and couple a portion of a rotary cutting tool therein, the tool receiver being mounted in the holder portion so as to be rotatable about a central axis of the tool adaptor to a limited extent,
wherein the tool receiver is mounted in the holder portion so as to be elastically resilient in both the axial and circumferential directions,
wherein the holder portion comprises a cavity beginning at a mouth portion, extending through a central portion, and ending with an end portion, the end portion having an end face disposed generally perpendicular to the central axis, and
wherein the tool receiver comprises:
a flange portion disposed in the mouth portion of the cavity;
an end portion disposed opposite the flange portion and oriented generally perpendicular to the central axis, the end portion being disposed in the end portion of the cavity;
a first damping member provided in the mouth portion of the cavity axially between the flange portion of the tool receiver and an edge of the central portion of the cavity; and
a second damping member provided in the end portion of the cavity axially between the end portion of the tool receiver and the end face of the cavity.

7. The tool adaptor of claim 6 wherein the second damping member is generally ring-like in shape and has an increased thickness along is outer circumference.

8. The tool adaptor of claim 6 wherein the tool receiver is coupled to the adaptor body via an axial clamp screw which passes through an aperture formed in the tool receiver and threadingly engages a threaded aperture formed in the adaptor body.

9. The tool adaptor of claim 8 wherein the axial clamp screw comprises an elastomeric member provided between a head portion of the axial clamp screw and the tool receiver.

10. A tool adapter comprising:
an adaptor body having a connection portion structured to be attached to a machine tool and a holder portion disposed opposite the connection portion; and
a tool receiver structured to receive and couple a portion of a rotary cutting tool therein, the tool receiver being mounted in the holder portion so as to be rotatable about a central axis of the tool adaptor to a limited extent,
wherein the tool receiver is mounted in the holder portion so as to be elastically resilient in both the axial and circumferential directions,
wherein the tool receiver is coupled to the adaptor body via an axial clamp screw which passes through an aperture formed in the tool receiver and threadingly engages a threaded aperture formed in the adaptor body,
wherein the adaptor body comprises a coolant passage disposed between the connection portion and the holder portion,
wherein the axial clamp screw comprises a central passage, and
wherein the coolant passage and the central passage are structured to provide a supply of coolant from the machine tool to the rotary cutting tool.

11. The tool adaptor of claim 10 wherein the axial clamp screw comprises an elastomeric member provided between a head portion of the axial clamp screw and the tool receiver.

12. The tool adaptor of claim 11 wherein the tool receiver further comprises a sealing member having one or more openings disposed between the rotary cutting tool and an end portion of the tool receiver, the sealing member being structured to prevent the escape of coolant from between the rotary cutting tool and the tool receiver.

* * * * *